United States Patent
Park et al.

(10) Patent No.: US 10,192,683 B2
(45) Date of Patent: Jan. 29, 2019

(54) MULTILAYER CAPACITOR AND BOARD HAVING THE MULTILAYER CAPACITOR MOUNTED THEREON

(71) Applicant: SAMSUNG ELECTRO-MECHANICS CO., LTD., Suwon-si, Gyeonggi-do (KR)

(72) Inventors: Heung Kil Park, Suwon-si (KR); Se Hun Park, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/644,185

(22) Filed: Jul. 7, 2017

(65) Prior Publication Data

US 2018/0182545 A1   Jun. 28, 2018

(30) Foreign Application Priority Data

Dec. 22, 2016   (KR) .......................... 10-2016-0177111

(51) Int. Cl.
  *H01G 2/06* (2006.01)
  *H01G 4/30* (2006.01)
  (Continued)

(52) U.S. Cl.
  CPC ............. *H01G 2/065* (2013.01); *H01G 4/005* (2013.01); *H01G 4/12* (2013.01); *H01G 4/232* (2013.01); *H01G 4/30* (2013.01)

(58) Field of Classification Search
  CPC .......... H01G 2/065; H01G 4/005; H01G 4/12; H01G 4/232; H01G 4/30
  See application file for complete search history.

(56) References Cited

U.S. PATENT DOCUMENTS 5,812,363 A * 9/1998 Kuroda .................... H01G 4/30
                                                          361/306.3
7,580,241 B2 * 8/2009 Sakashita .............. C04B 35/462
                                                          361/306.1
(Continued)

FOREIGN PATENT DOCUMENTS

JP        2000-306765 A     11/2000
JP        2014-027085 A      2/2014
(Continued)

*Primary Examiner* — Dion Ferguson
(74) *Attorney, Agent, or Firm* — McDermott Will & Emery LLP

(57) ABSTRACT

A multilayer capacitor includes a capacitor body, dielectric layers and a plurality of first internal electrodes and second internal electrodes forming a portion of the capacitor body, the plurality of first internal electrodes and second internal electrodes alternately disposed with respective dielectric layers interposed therebetween, the capacitor body further having a first surface and a second surface opposing each other, a third surface and a fourth surface opposing each other, and a fifth surface and a sixth surface opposing each other, the first internal electrodes and the second internal electrodes being exposed through at least the third surface and the fourth surface, respectively, an insulating layer disposed in the first surface of the capacitor body, a buffer layer at least partially covering the insulating layer, and a first terminal electrode and a second terminal electrode spaced apart from each other.

20 Claims, 8 Drawing Sheets

(51) Int. Cl.
   *H01G 4/232*  (2006.01)
   *H01G 4/12*   (2006.01)
   *H01G 4/005*  (2006.01)

(56) References Cited

U.S. PATENT DOCUMENTS

| | | | |
|---|---|---|---|
| 9,159,492 B2* | 10/2015 | Oguni | C04B 35/4682 |
| 9,818,538 B2* | 11/2017 | Kim | H01G 4/12 |
| 2006/0215350 A1* | 9/2006 | Tonogai | H01G 4/30 |
| | | | 361/311 |
| 2012/0218678 A1* | 8/2012 | Satou | H01G 4/12 |
| | | | 361/303 |
| 2013/0050897 A1* | 2/2013 | Kim | H01G 4/12 |
| | | | 361/321.2 |
| 2013/0050899 A1* | 2/2013 | Kim et al. | H01G 4/30 |
| | | | 361/321.2 |
| 2014/0085852 A1 | 3/2014 | Park et al. | |
| 2015/0114701 A1* | 4/2015 | Chung | H01G 4/12 |
| | | | 174/260 |
| 2015/0287533 A1* | 10/2015 | Lee | H01G 4/30 |
| | | | 174/260 |
| 2015/0332852 A1* | 11/2015 | Kim | H05K 1/181 |
| | | | 174/260 |
| 2017/0171980 A1* | 6/2017 | Hattori et al. | H01G 4/005 |

FOREIGN PATENT DOCUMENTS

| | | |
|---|---|---|
| JP | 2014-036149 A | 2/2014 |
| KR | 10-1444534 B1 | 9/2014 |

* cited by examiner

MULTILAYER CAPACITOR AND BOARD HAVING THE MULTILAYER CAPACITOR MOUNTED THEREON

CROSS-REFERENCE TO RELATED APPLICATION

This application claims the benefit of priority to Korean Patent Application No. 10-2016-0177111, filed on Dec. 22, 2016 with the Korean Intellectual Property Office, the entirety of which is incorporated herein by reference.

TECHNICAL FIELD

The present disclosure relates to a multilayer capacitor and a board having the multilayer capacitor mounted thereon.

BACKGROUND

A multilayer ceramic capacitor (MLCC), a multilayer chip electronic component, is a capacitor in the form of a chip mounted on a substrate of electronic products such as an image display device, such as a liquid crystal display (LCD), a plasma display panel (PDP), and the like, a computer, a personal digital assistant (PDA), a cellular phone, and the like, serving to charge and discharge electricity.

An MLCC has the advantages of being small, securing high capacitance, and being easily mounted, so it may be used as a component of various electronic devices.

The MLCC may have a structure in which a plurality of dielectric layers, and internal electrodes having different polarities, interposed between the dielectric layers, are alternately stacked.

Since the dielectric layer has piezoelectric and piezoresistive properties, when a direct current (DC) or alternating current (AC) voltage is applied to an MLCC, a piezoelectric phenomenon may occur between the internal electrodes, resulting in vibrations.

As the vibrations are transmitted to a board on which the MLCC is mounted through an external electrode of a MLCC, the entirety of the board becomes an acoustic reflective surface, so vibrational sounds, becoming noise, may be generated.

The vibration sound may correspond to an audible frequency in the range of 20 Hz to 20,000 Hz, which may be unpleasant for listeners, and the vibration sound is referred to as acoustic noise.

Recently, a low noise design of an electronic product has become important, and acoustic noise generated in an MLCC is becoming an issue. In detail, a reduction in acoustic noise occurring in an electronic product having a voice communication function, such as a smartphone has been required.

SUMMARY

An aspect of the present disclosure provides a multilayer capacitor capable of reducing piezoelectric vibrations to reduce acoustic noise, and a board having the same mounted thereon.

According to an aspect of the present disclosure, a multilayer capacitor includes: a capacitor body including dielectric layers and a plurality of first internal electrodes and second internal electrodes alternately disposed with respective dielectric layers interposed therebetween, and having a first surface and a second surface opposing each other, a third surface and a fourth surface connected to the first surface and the second surface and opposing each other, and a fifth surface and a sixth surface connected to the first surface and the second surface, connected to the third surface and the fourth surface, and opposing each other, the first internal electrodes and the second internal electrodes being exposed through at least the third surface and the fourth surface, respectively; an insulating layer formed in the first surface of the capacitor body; a buffer layer covering the insulating layer; and a first terminal electrode and a second terminal electrode extended from the third surface and the fourth surface of the capacitor body to the buffer layer, respectively, and spaced apart from each other.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
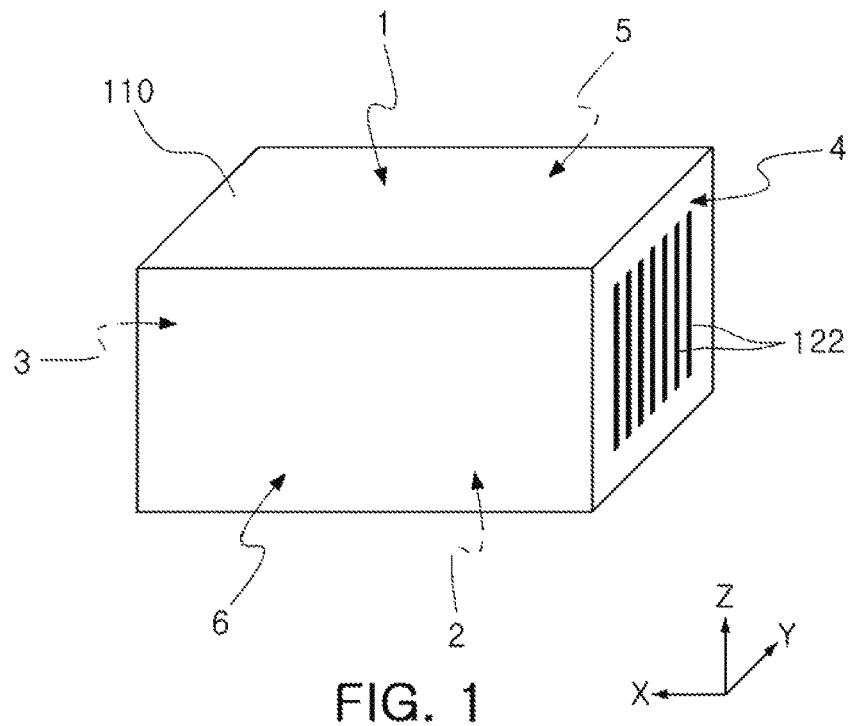
FIG. 1 is a perspective view illustrating a capacitor body in a multilayer capacitor according to a first embodiment of the present disclosure.

Hereinafter, exemplary embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being 'on,' 'connected to,' or 'coupled to' another element, it can be directly 'on,' 'connected to,' or 'coupled to' the other element or other elements intervening therebetween may be present. In contrast, when an element is referred to as being 'directly on,' 'directly connected to,' or 'directly coupled to' another element, there may be no other elements or layers intervening therebetween. Like numerals refer to like elements throughout. As used herein, the term 'and/or' includes any and all combinations of one or more of the associated listed items.

It will be apparent that although the terms first, second, third, etc. may be used herein to describe various members, components, regions, layers and/or sections, any such members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as 'above,' 'upper,' 'below,' and 'lower' and the like, may be used herein for ease of description to describe one element's relationship relative to another element(s) as shown in the figures. It will be understood that spatially relative terms are intended to encompass different orientations of the device in use or operation, in addition to the orientation depicted in the figures. For example, if the device in the figures is turned over, elements described as 'above,' or 'upper' relative to other elements would then be oriented 'below,' or 'lower' relative to the other elements or features. Thus, the term 'above' can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms 'a,' 'an,' and 'the' are intended to include the plural forms as well, unless the context clearly indicates otherwise. It will be further understood that the terms 'comprises,' and/or 'comprising' when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, exemplary embodiments of the present disclosure will be described with reference to views illustrating exemplary embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted alone, in combination or in partial combination.

The contents of the present disclosure described below may have a variety of configurations and propose only a required configuration herein, but are not limited thereto.

When a direction of a capacitor body is defined to clearly illustrate exemplary embodiments of the present disclosure, X, Y, and Z, denoted on the drawings, represent a longitudinal direction, a width direction, and a thickness direction, respectively. Here, the width direction may be used in the same concept as a direction in which a dielectric layer and an internal electrode are stacked.

In addition, in some exemplary embodiments, for convenience of explanation, both surfaces opposing in a Z-direction of a capacitor body 110 are set as a first surface 1 and a second surface 2, both surfaces opposing in an X-direction and connecting the first surface 1 and the second surface 2 are set as a third surface 3 and a fourth surface 4, and both surfaces opposing in a Y-direction and connecting the first surface 1 and the second surface 2 as well as the third surface 3 and the fourth surface 4 are set as a fifth surface 5 and a sixth surface 6, which will be described together. Here, the first surface 1 may be used as having the same concept as a mounting surface.

Multilayer Capacitor

Figure 2:
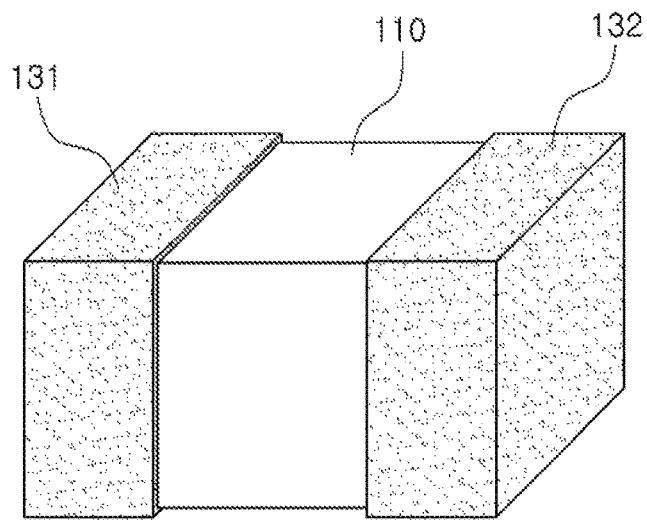
FIG. 2 is a perspective view illustrating the multilayer capacitor according to the first embodiment of the present disclosure in which a first external electrode and a second external electrode are formed on a capacitor body.
Figure 3:
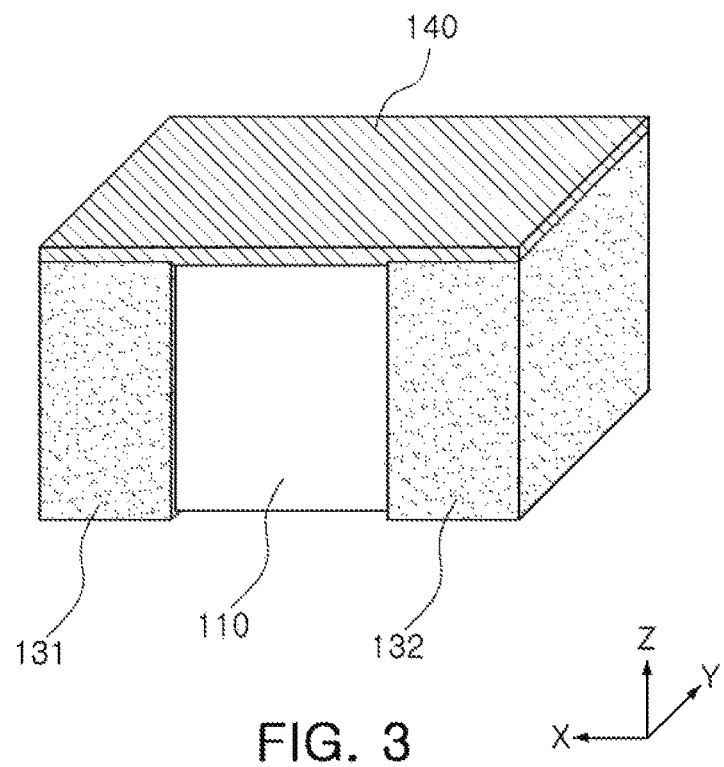
FIG. 3 is a perspective view illustrating an insulating layer further formed in the multilayer capacitor of FIG. 2.
Figure 4:
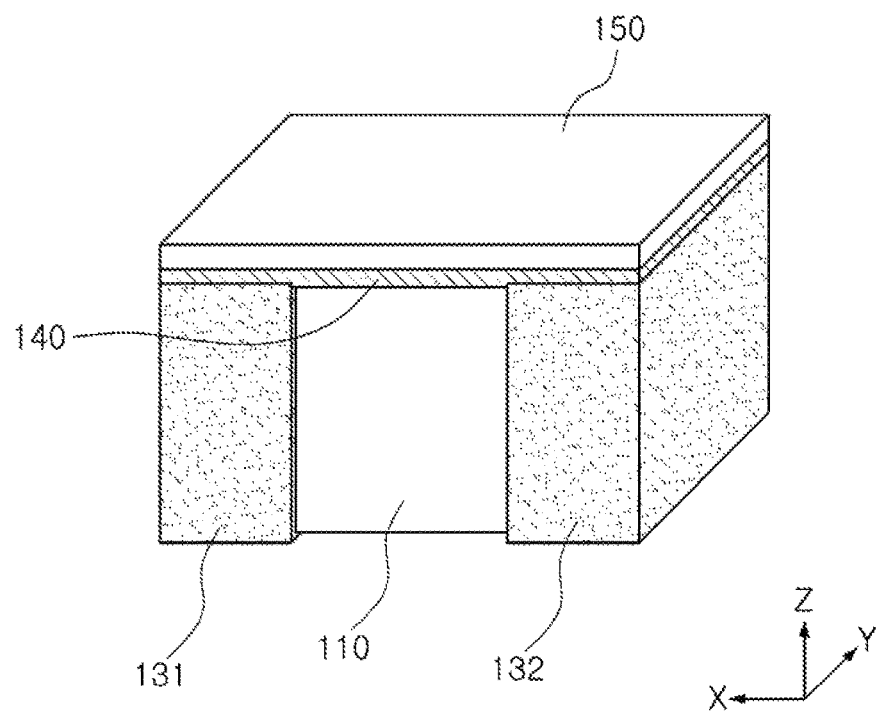
FIG. 4 is a perspective view illustrating a buffer layer formed in the multilayer capacitor of FIG. 3.
Figure 5:
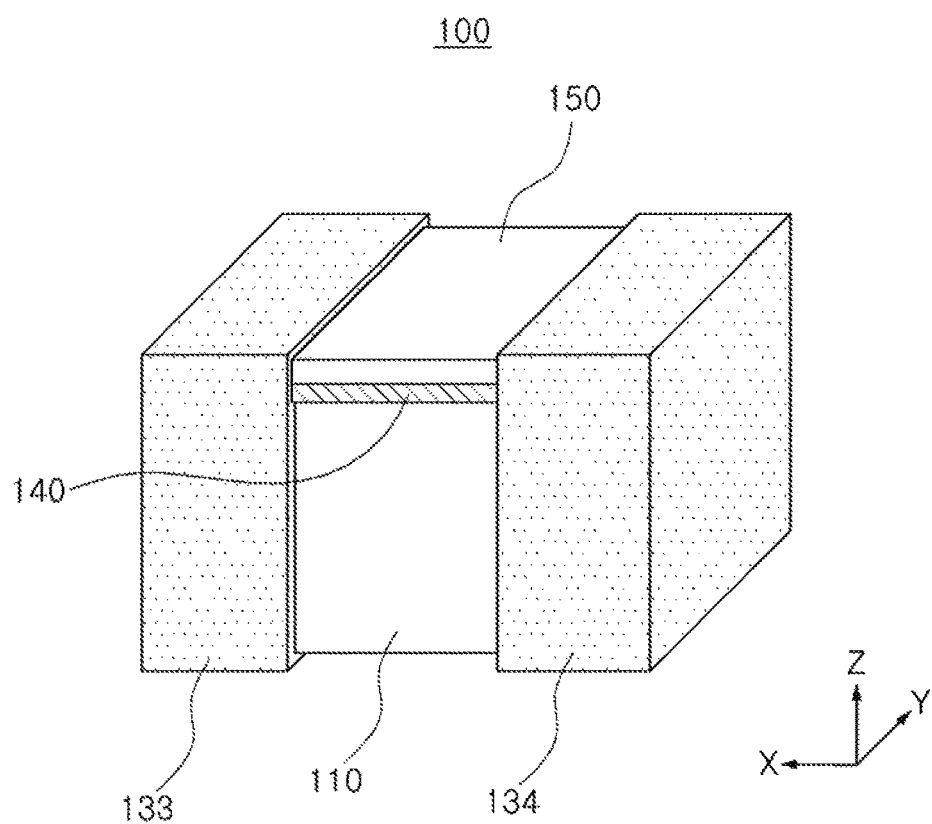
FIG. 5 is a perspective view illustrating a first terminal electrode and a second terminal electrode further formed in the multilayer capacitor of FIG. 3.
Figure 6:
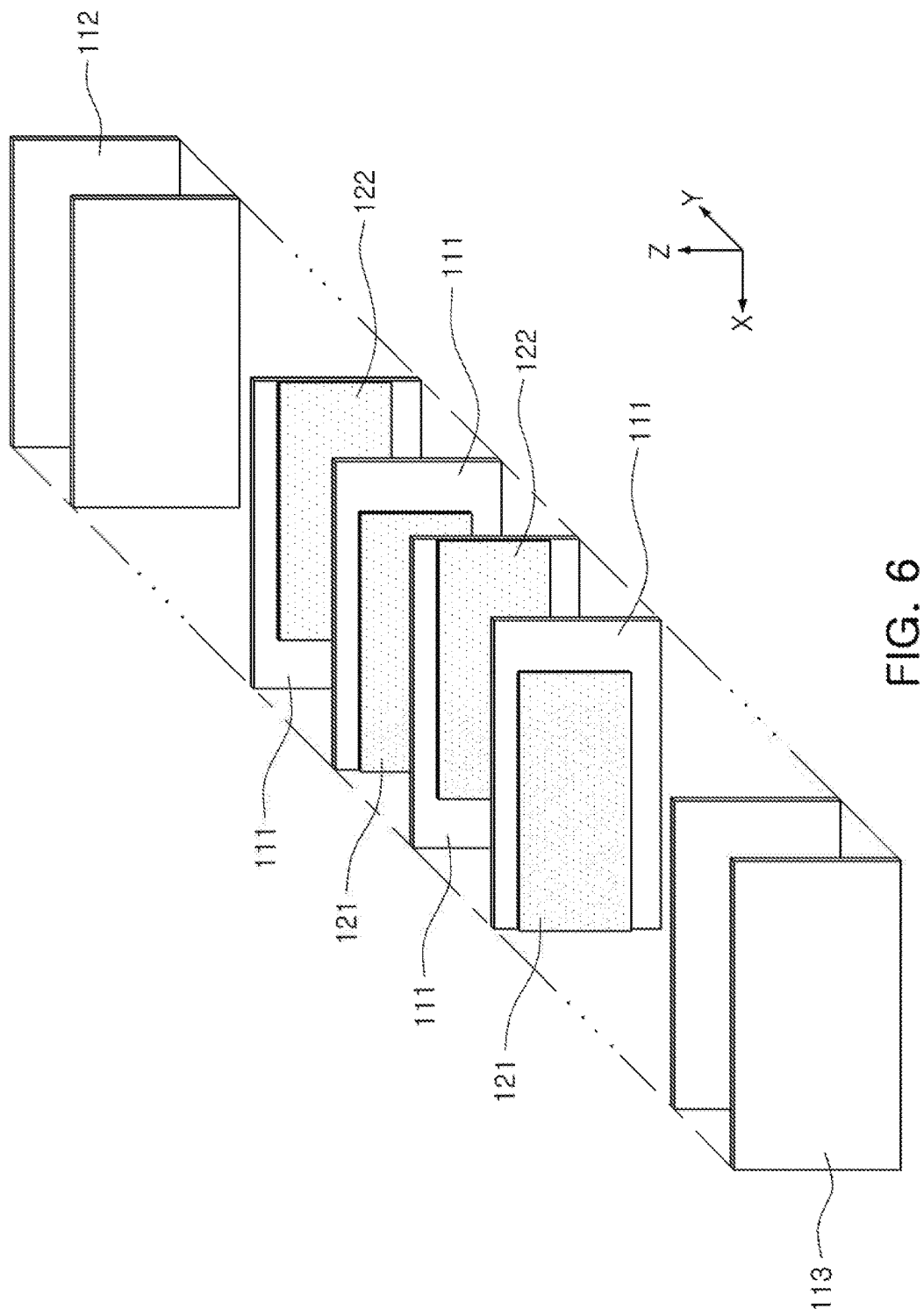
FIG. 6 is an exploded perspective view illustrating a first internal electrode and a second internal electrode in the multilayer capacitor according to the first embodiment of the present disclosure.

FIG. 1 is a perspective view illustrating a capacitor body in a multilayer capacitor according to a first embodiment of the present disclosure, FIG. 2 is a perspective view illustrating the multilayer capacitor according to a first embodiment of the present disclosure in which a first external electrode and a second external electrode are formed on a capacitor body, FIG. 3 is a perspective view illustrating an insulating layer further formed in the multilayer capacitor of FIG. 2, FIG. 4 is a perspective view illustrating a buffer layer further formed in the multilayer capacitor of FIG. 3, FIG. 5 is a perspective view illustrating a first terminal electrode and a second terminal electrode formed in the multilayer capacitor of FIG. 3, and FIG. 6 is a perspective view illustrating a first internal electrode and a second internal electrode in the multilayer capacitor according to a first embodiment of the present disclosure.

With reference to FIGS. 1 to 6, a multilayer capacitor 100 according to a first embodiment of the present disclosure may include a capacitor body 110 including a dielectric layer 111 and a plurality of first internal electrodes 121 and second internal electrodes 122, an insulating layer 140 formed in a first surface 1 of the capacitor body 110, a buffer layer 150 formed in the first surface of the insulating layer 140, and a first terminal electrode 133 and a second terminal electrode 134 formed to be extended from a third surface 3 and a fourth surface 4 of the capacitor body 110 to a portion of a first surface of the buffer layer 150. The first terminal electrode 133 and the second terminal electrode 134 are spaced apart from each other in an X-direction.

The capacitor body 110 is formed by stacking a plurality of dielectric layers 111 in a Y-direction, perpendicular to the first surface 1, and may have an approximately hexahedral shape as illustrated, but is not limited thereto.

In this case, a shape of the capacitor body 110, dimensions thereof, and the stacking number of the dielectric layer 111, are not limited to those illustrated in the drawings.

In addition, the dielectric layer 111 is in a sintered state, and boundaries between the dielectric layers 111 adjacent each other may be integrated, so that the boundaries may be difficult to be seen without using a scanning electron microscope (SEM).

The capacitor body 110 may include an active region including a first internal electrode 121 and a second internal electrode 122, as a portion contributing to capacitance formation of a capacitor, and cover regions disposed on both sides of the active region in a Y-direction, as margin portions.

The active region may be formed by repeatedly stacking a plurality of first internal electrodes 121 and second internal electrodes 122 with the dielectric layers 111 interposed therebetween.

In this case, a thickness of the dielectric layer 111 may be arbitrarily altered, according to a capacitance design of the multilayer capacitor 100.

In addition, the dielectric layer 111 may include ceramic powder with a high dielectric constant, for example, a barium titanate ($BaTiO_3$)-based or strontium titanate ($SrTiO_3$)-based powder, but exemplary embodiments are not limited thereto.

In addition, in the dielectric layer 111, with the ceramic powder, when necessary, at least one or more of a ceramic additive, an organic solvent, a plasticizer, a binder, a dispersant, and the like may further be added thereto.

The cover regions may have the same material and configuration as the dielectric layer 111, except that the cover regions are disposed on both respective sides of the capacitor body 110 in a Y-direction, and do not include an internal electrode.

The cover regions may be prepared by stacking single dielectric layers 112 and 113, or two or more dielectric layers 112 and 113 on both ends of the active region in a Y-direction, and may serve to prevent damage to the first internal electrode 121 and the second internal electrode 122 caused by physical or chemical stresses.

The first internal electrode 121 and the second internal electrode 122 are electrodes having different polarities.

The first internal electrode 121 and the second internal electrode 122 are alternately disposed in a Y-direction with the dielectric layer 111 interposed therebetween inside the capacitor body 110, and an area in which the first internal electrode 121 and the second internal electrode 122 overlap each other in a Y-direction is related to capacitance formation of a capacitor.

In addition, the first internal electrode 121 and the second internal electrode 122 may be formed by printing conductive paste containing a conductive metal with a predetermined thickness on the dielectric layer 111, and may be electrically insulated from each other by the dielectric layer 111 interposed therebetween.

The conductive metal contained in the conductive paste may be, for example, nickel (Ni), copper (Cu), palladium (Pd) or alloys thereof, but exemplary embodiments are not limited thereto.

In addition, a printing method of the conductive paste may be a screen printing method, a gavure printing method, or the like, but exemplary embodiments are not limited thereto.

One end of the first internal electrode 121 in an X-direction may be exposed through the third surface 3 of the capacitor body 110, and one end of the second internal electrode 122 in an X-direction may be exposed through the fourth surface 4 of the capacitor body 110. However, a lead-out structure of an internal electrode according to the present disclosure is not limited thereto, and may be variously changed when necessary or desired.

The multilayer capacitor 100 according to exemplary embodiments may further include a first external electrode 131 and a second external electrode 132.

The first external electrode 131 and the second external electrode 132 are disposed in the third surface 3 and the fourth surface 4 of the capacitor body 110, respectively, and may be formed by applying and sintering conductive metal and conductive paste containing glass. The conductive metal may be nickel (Ni), copper (Cu), palladium (Pd), gold (Au), or alloys thereof, but exemplary embodiments are not limited thereto.

In this case, the first external electrode 131 and the second external electrode 132 may include a first connection portion and a second connection portion formed in the third surface 3 and the fourth surface 4 of the capacitor body 110, respectively, and connected to exposed ends of the first internal electrode 121 and the second internal electrode 122, respectively, and a first band portion and a second band portion extended from the first connection portion and the second connection portion to portions of the first surface 1 and the second surface 2 and portions of the fifth surface 5 and sixth surface 6 of the capacitor body 110, respectively.

The insulating layer 140 may be formed of a thermosetting resin such as epoxy, but exemplary embodiments are not limited thereto.

In an exemplary embodiment, the insulating layer 140 may be formed to cover the entirety of the first surface 1 of the capacitor body 110.

In addition, when the first external electrode 131 and the second external electrode 132 have a first band portion and a second band portion, the insulating layer 140 may be formed to cover the first band portion and the second band portion formed in the first surface 1 of the capacitor body 110.

The insulating layer 140 primarily absorbs piezoelectric vibrations of the capacitor body 110 due to an elastic force.

The buffer layer 150 may cover the insulating layer 140.

The buffer layer 150 may be formed of a ceramic material, and may further reduce piezoelectric vibrations of the capacitor body 110.

In more detail, the buffer layer 150 may absorb piezoelectric vibrations, having been primarily reduced in the insulating layer 140, due to high rigidity. As the buffer layer is essentially not self-deformed, the buffer layer moves only in a Z-direction without deformation in an X-direction and a Y-direction, so only minimal vibrations are transmitted to a board.

In addition, the buffer layer 150 serves to allow a capacitor body to be spaced apart from a substrate, so a height of a solder in a direction opposite to a direction in which a multilayer capacitor is mounted may be reduced.

The first terminal electrode 133 and the second terminal electrode 134 may be formed of a conductive metal, which is a filler, and a conductive resin containing a resin. In this case, the resin may be a thermosetting resin.

The first terminal electrode 133 and the second terminal electrode 134 are formed over the outermost portion, in which the insulating layer 140 and the buffer layer 150 are bonded in the capacitor body 110, and thus may serve to further relieve strain stress caused by thermal expansion of the dielectric layer 111 included in the capacitor body 110.

In addition, the first terminal electrode and the second terminal electrode prevent the insulating layer 140 from being separated from the capacitor body 110, so a stable acoustic noise reduction effect may be expected in the long term.

The first terminal electrode 133 and the second terminal electrode 134 are extended from the third surface 3 and the fourth surface 4 of the capacitor body 110 to the buffer layer 150, respectively, and may be formed to be spaced apart from each other.

In exemplary embodiments, the first terminal electrode 133 may be formed to cover exposed portions of a first connection portion and a first band portion of the first external electrode 131, a third surface of the insulating layer 140, and a third surface and a portion of a first surface of the buffer layer 150.

In this case, the first terminal electrode 133 may be formed to further cover portions of a fifth surface and a sixth surface of the insulating layer 140, and portions of a fifth surface and a sixth surface of the buffer layer 150.

The second terminal electrode 134 may be formed to cover exposed portions of a second connection portion and a second band portion of the second external electrode 132, a fourth surface of the insulating layer 140, and a fourth surface and a portion of a first surface of the buffer layer 150.

In this case, the second terminal electrode 134 may be formed to further cover portions of a fifth surface and a sixth surface of the insulating layer 140, and portions of a fifth surface and a sixth surface of the buffer layer 150.

Figure 7:
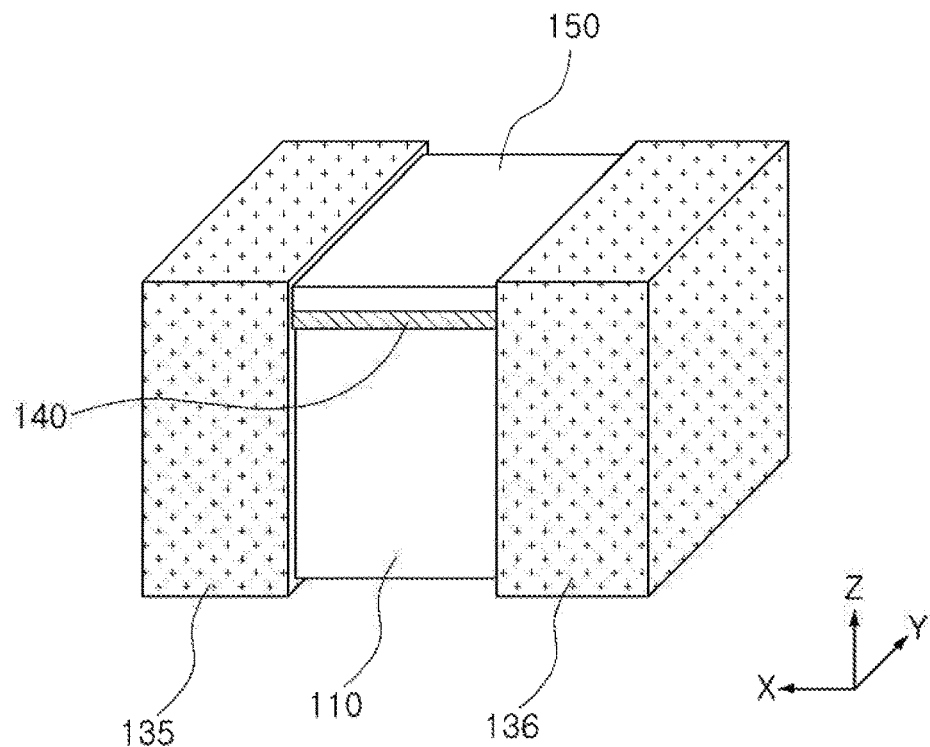
FIG. 7 is a perspective view showing a plating layer formed in the multilayer capacitor of FIG. 5.

Meanwhile, as illustrated in FIG. 7, the multilayer capacitor 100 according to exemplary embodiments may further include plating layers 135 and 136 formed in the first terminal electrode 133 and the second terminal electrode 134.

In this case, the plating layers 135 and 136 may have a structure in which a nickel (Ni) plating layer and a tin (Sn) plating layer are sequentially stacked.

Modified Example

Figure 8:
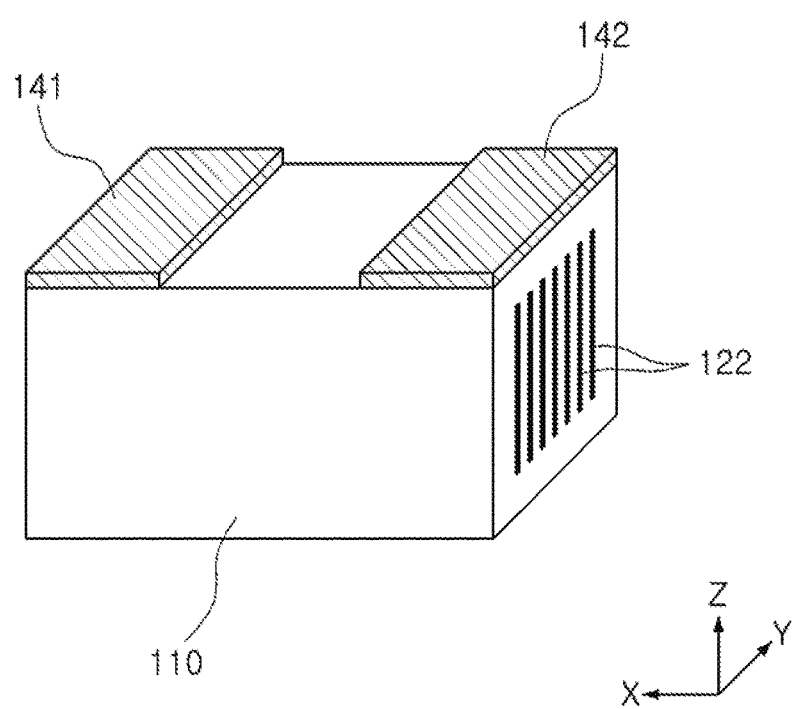
FIG. 8 is a perspective view illustrating a multilayer capacitor according to a second embodiment of the present disclosure in which a first insulating layer and a second insulating layer are formed in a capacitor body.
Figure 9:
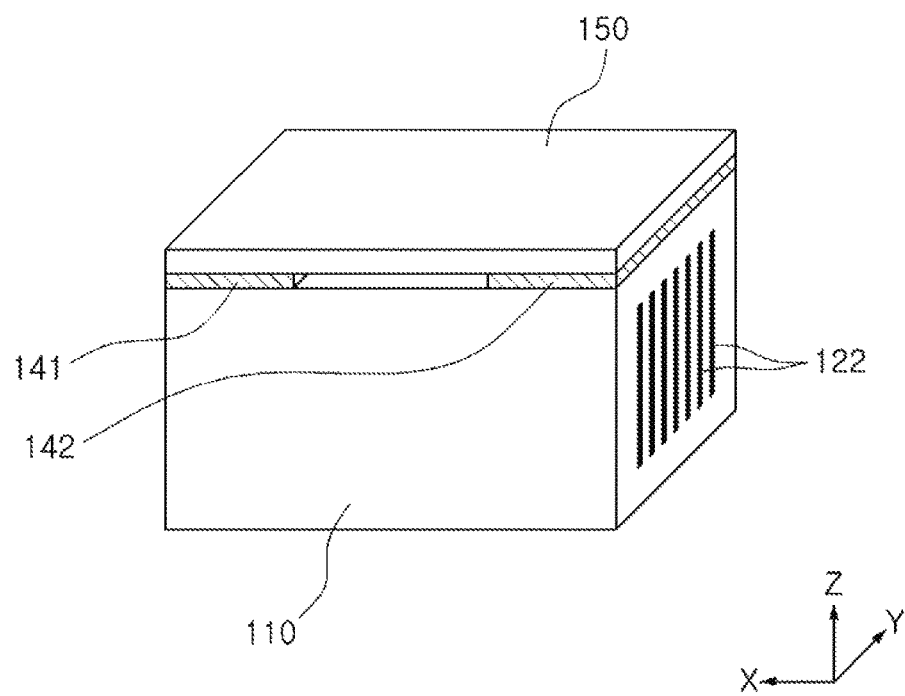
FIG. 9 is a perspective view illustrating a buffer layer formed in the multilayer capacitor of FIG. 8.
Figure 10:
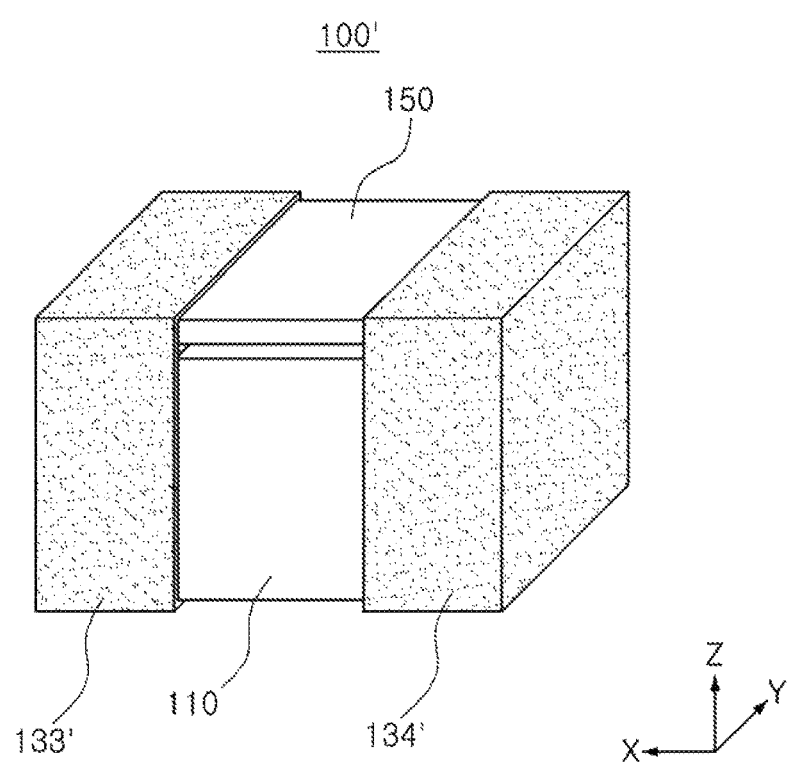
FIG. 10 is a perspective view illustrating a first terminal electrode and a second terminal electrode formed in the multilayer capacitor of FIG. 9.

FIG. 8 is a perspective view illustrating a multilayer capacitor according to a second embodiment of the present disclosure in which a first insulating layer and a second insulating layer are formed in a capacitor body, FIG. 9 is a perspective view illustrating that a buffer layer is further formed in the multilayer capacitor of FIG. 8, and FIG. 10 is a perspective view illustrating a first terminal electrode and a second terminal electrode formed in the multilayer capacitor of FIG. 9.

Here, structures of a dielectric layer 111, a first internal electrode 121 and a second internal electrode 122, a capacitor body 110, an insulating layer 140, and a buffer layer 150 are similar to those according to the first exemplary embodiment described previously, so a detailed description will be omitted in order to avoid redundancy.

With reference to FIGS. 8 and 10, an insulating layer of a multilayer capacitor 100' according to exemplary embodiments may include a first insulating layer 141 and a second insulating layer 142 disposed to be spaced apart from each other in an X-direction in a first surface 1 of a capacitor body 110 except for a central portion thereof.

In this case, maximum displacement of the central portion of the capacitor body 110 is reduced by the first insulating layer 141 and the second insulating layer 142, so an amount of vibrations transmitted to a board may be effectively reduced.

In other words, due to an elastic force of the first insulating layer 141 and the second insulating layer 142, vibrations of the capacitor body 110 are absorbed. Further, as a portion of a central portion, bonded to the capacitor body 110, is removed, maximum vibration displacement transmission is reduced. Thus, a double vibration reduction effect may be expected only in an insulating layer.

In addition, a first terminal electrode 133' may be formed to cover a third surface 3 of the capacitor body 110 and a third surface of the first insulating layer 141 as well as a third surface and a portion of a first surface of a buffer layer 150.

A second terminal electrode 134' may be formed to cover a fourth surface 4 of the capacitor body 110 and a fourth surface of the second insulating layer 142 as well as a fourth surface and a portion of a first surface of the buffer layer 150.

In this case, the first terminal electrode 133' may be formed to further cover portions of a fifth surface and a sixth surface of the insulating layer 140, and portions of a fifth surface and a sixth surface of the buffer layer 150, and the second terminal electrode 134' may be formed to further cover portions of a fifth surface and a sixth surface of the insulating layer 140, and portions of a fifth surface and a sixth surface of the buffer layer 150.

Thus, the first terminal electrode 133' and the second terminal electrode 134' thirdly reduce piezoelectric vibrations of the capacitor body 110, thereby further reducing acoustic noise.

Figure 11:
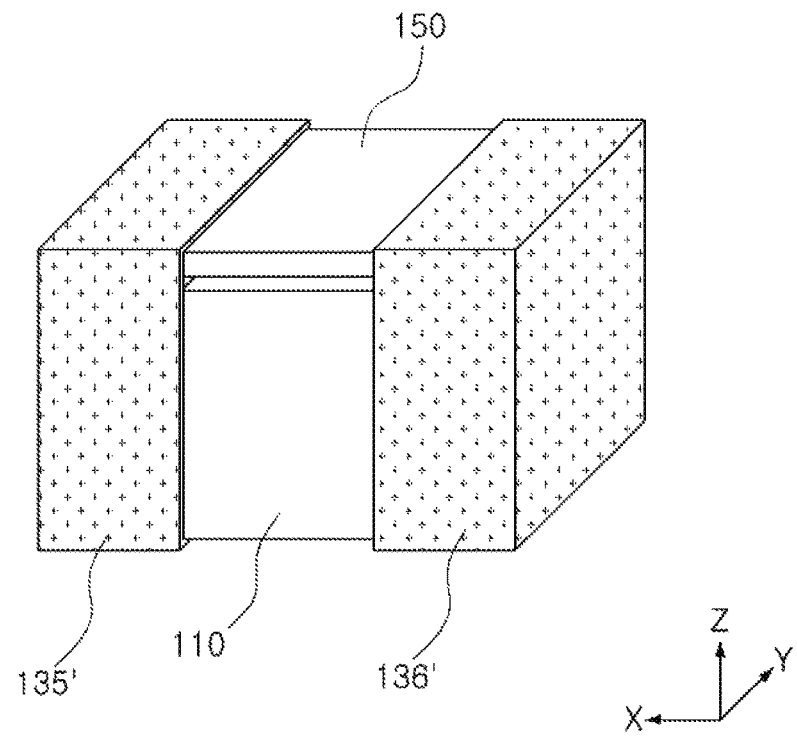
FIG. 11 is a perspective view illustrating a plating layer formed in the multilayer capacitor of FIG. 10.

Meanwhile, as illustrated in FIG. 11, in the multilayer capacitor 100' according to exemplary embodiments, plating layers 135' and 136' may further be formed on the first terminal electrode 133' and the second terminal electrode 134'.

In this case, the plating layers 135' and 136' may have a structure in which a nickel (Ni) plating layer and a tin (Sn) plating layer are sequentially stacked.

Board Having Multilayer Capacitor Mounted Thereon

Figure 12:
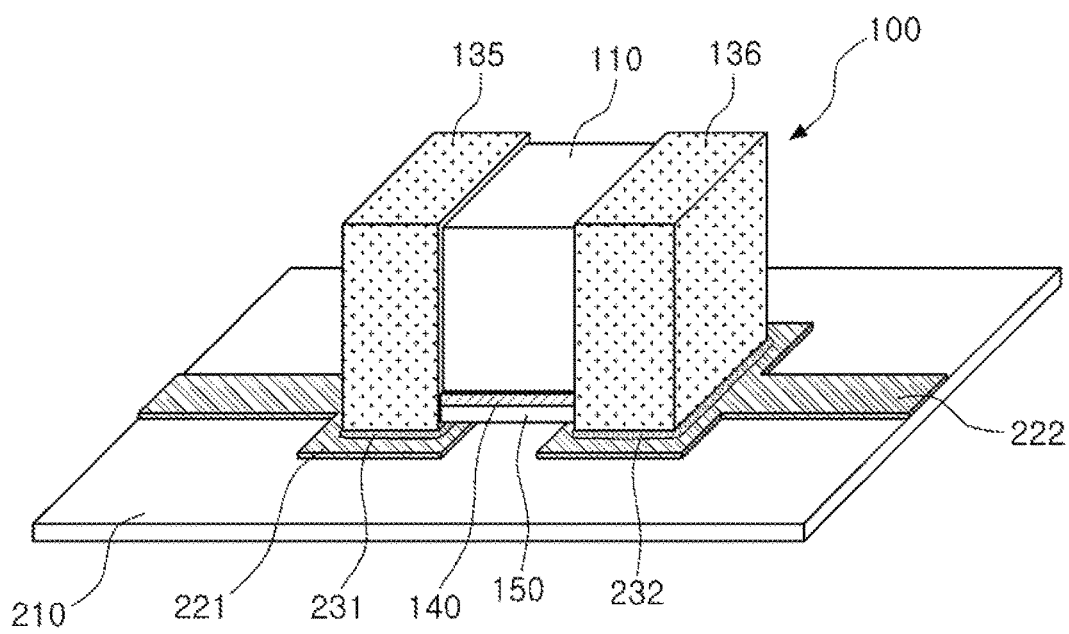
FIG. 12 is a perspective view schematically illustrating the multilayer capacitor of FIG. 7 mounted on a substrate.

With reference to FIG. 12, a board having a multilayer capacitor, according to exemplary embodiments of the present disclosure, mounted thereon may include a substrate 210 on which a multilayer capacitor 100 according to a first exemplary embodiment is mounted, and a first electrode pad 221 and a second electrode pad 222 spaced apart from each other in an X-direction on an upper surface of the substrate 210.

As plating layers 135 and 136 formed on a first terminal electrode 133 and a second terminal electrode 134 are fixed by solders 231 and 232, while disposed above the first electrode pad 221 and the second electrode pad 222, the multilayer capacitor 100 may be electrically connected to the substrate 210.

In addition, although not illustrated, the multilayer capacitor of FIG. 11 may be mounted on a substrate with a structure similar thereto.

Figure 13:
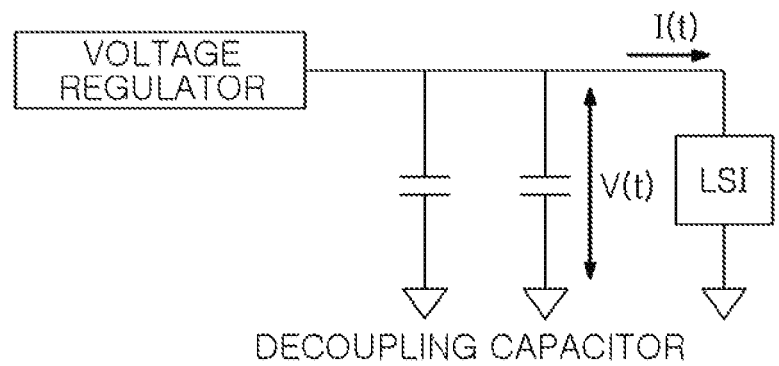
FIG. 13 is a circuit diagram schematically illustrating an exemplary embodiment of the multilayer capacitor according to a first embodiment of the present disclosure used as a decoupling capacitor of a power circuit of a large scale integrated circuit (LSI)
Figure 14:
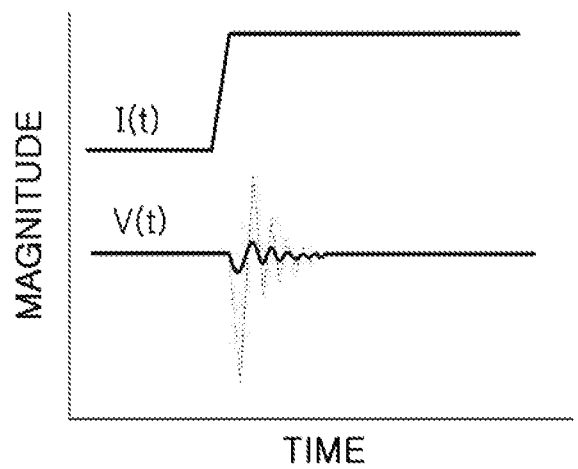
FIG. 14 is a graph illustrating a change in current and a variation of voltage in the circuit of FIG. 13.

FIG. 13 is a circuit diagram schematically illustrating exemplary embodiments in which a multilayer capacitor according to the present disclosure is used as a decoupling capacitor of an LSI power circuit, and FIG. 14 is a graph illustrating a change in current I (t) and a variation of voltage V (t) in a circuit of FIG. 13.

With reference to FIGS. 13 and 14, a plurality of decoupling capacitors, disposed between a voltage regulator and LSI, absorb a change in sudden and large current flowing in LSI and a variation of voltage occurring by wiring inductance, and thus may serve to stabilize a power supply voltage.

In this case, between respective capacitors, anti-resonance may be induced and impedance may increase.

When a multilayer capacitor according to exemplary embodiments is applied as a decoupling capacitor used in an LSI power circuit, due to a terminal electrode formed in a surface on which a capacitor body is mounted, a current path is reduced, so equivalent series inductance (ESL) may be reduced.

Thus, a change in current and a variation of voltage occurring by wiring inductance are absorbed well, so power impedance may be significantly reduced.

In this case, system stability to a power noise of an LSI may be significantly improved.

As set forth above, according to exemplary embodiments, acoustic noise is primarily reduced as piezoelectric vibrations are absorbed due to an elastic force of an insulating layer, and acoustic noise is secondarily further reduced due to a buffer layer, so piezoelectric vibrations of a multilayer capacitor may be doubly reduced. Thus, total acoustic noise may be reduced.

While exemplary embodiments have been shown and described above, it will be apparent to those skilled in the art that modifications and variations could be made without departing from the scope of the present disclosure as defined by the appended claims.

What is claimed is:

1. A multilayer capacitor, comprising:
    a capacitor body including dielectric layers and a plurality of first internal electrodes and second internal electrodes, the plurality of first internal electrodes and second internal electrodes alternately disposed with respective dielectric layers interposed therebetween, the capacitor body further having a first surface and a second surface opposing each other, a third surface and a fourth surface each connected to each of the first surface and the second surface and the third surface and the fourth surface opposing each other, and a fifth surface and a sixth surface each connected to each of the first surface and the second surface, each of the fifth surface and the sixth surface connected to each of the third surface and the fourth surface, and the fifth surface and the sixth surface opposing each other, the first internal electrodes and the second internal electrodes being exposed through at least the third surface and the fourth surface, respectively;
    an insulating layer disposed on the first surface of the capacitor body;
    a buffer layer at least partially covering the insulating layer;
    a first terminal electrode and a second terminal electrode extended from the third surface and the fourth surface of the capacitor body to the buffer layer, respectively, and spaced apart from each other; and
    a first external electrode and a second external electrode disposed on the third surface and the fourth surface of the capacitor body, respectively, so that on a same side of the capacitor body at least a portion of at least one of the insulating layer or the buffer layer is arranged between at least one of the first external electrode or the second external electrode and at least one of the first terminal electrode or the second terminal electrode, respectively.

2. The multilayer capacitor of claim 1, further comprising plating layers disposed on the first terminal electrode and the second terminal electrode.

3. The multilayer capacitor of claim 1, wherein the dielectric layers, the first internal electrodes, and the second internal electrodes are stacked in a direction perpendicular to a mounting surface.

4. The multilayer capacitor of claim 1, wherein the first surface of the capacitor body is a mounting surface.

5. The multilayer capacitor of claim 1, wherein the insulating layer is formed of a first insulating layer and a second insulating layer spaced apart from each other in a direction in which the third surface and the fourth surface of the capacitor body are connected to each other.

6. The multilayer capacitor of claim 1, wherein each of the first external electrode and the second external electrode includes a first connection portion and a second connection portion disposed on the third surface and the fourth surface of the capacitor body, respectively, and a first band portion and a second band portion extended from the first connection portion and the second connection portion to portions of the first surface and the second surface of the capacitor body and portions of the fifth surface and the sixth surface thereof.

7. A board having a multilayer capacitor mounted thereon, the board comprising:
    a substrate including a first electrode pad and a second electrode pad, the first electrode pad and the second electrode pad being spaced apart from each other; and
    the multilayer capacitor of claim 1 mounted on the substrate and the first terminal electrode and the second terminal electrode are connected to the first electrode pad and the second electrode pad, respectively.

8. The multilayer capacitor of claim 1, wherein the insulating layer is composed of a material different than the dielectric layers.

9. The multilayer capacitor of claim 8, wherein the material includes a thermosetting resin.

10. The multilayer capacitor of claim 1, wherein the first and second terminal electrodes are each composed of a material different than the first and second external electrodes, respectively.

11. The multilayer capacitor of claim 10, wherein the material includes a conductive metal and a conductive resin.

12. A multilayer capacitor, comprising:
    a capacitor body including dielectric layers and a plurality of first internal electrodes and second internal electrodes alternately disposed with respective dielectric layers interposed therebetween,
    an insulating layer disposed on one surface of the capacitor body;
    a buffer layer at least partially covering the insulating layer;
    a first terminal electrode and a second terminal electrode extended from a first surface and a second surface of the capacitor body to the buffer layer, respectively, and spaced apart from each other; and
    a first external electrode and a second external electrode disposed on the first surface and the second surface of the capacitor body, respectively, so that on a same side of the capacitor body at least a portion of at least one of the insulating layer or the buffer layer is arranged between at least one of the first external electrode or the second external electrode and at least one of the first terminal electrode or the second terminal electrode, respectively.

13. The multilayer capacitor of claim 12, wherein the insulating layer includes a single insulating layer disposed on the one surface of the capacitor body.

14. The multilayer capacitor of claim 12, wherein the insulating layer includes more than one insulating layer disposed on the one surface of the capacitor body.

15. The multilayer capacitor of claim 14, wherein the more than one insulating layer disposed on the one surface of the capacitor body are spaced apart from one another.

16. The multilayer capacitor of claim 12, further comprising plating layers disposed on the first terminal electrode and the second terminal electrode.

17. The multilayer capacitor of claim 12, wherein the insulating layer is composed of a material different than the dielectric layers.

18. The multilayer capacitor of claim 17, wherein the material includes a thermosetting resin.

19. The multilayer capacitor of claim 12, wherein the first and second terminal electrodes are each composed of a material different than the first and second external electrodes, respectively.

20. The multilayer capacitor of claim 19, wherein the material includes a conductive metal and a conductive resin.

* * * * *